US009160212B2

(12) United States Patent
McCoy

(10) Patent No.: US 9,160,212 B2
(45) Date of Patent: Oct. 13, 2015

(54) MULTI-SOURCE PASSIVE ENERGY POWER GENERATION

(76) Inventor: Byron A McCoy, Appomattox, VA (US)

(*) Notice: Subject to any disclaimer, the term of this patent is extended or adjusted under 35 U.S.C. 154(b) by 552 days.

(21) Appl. No.: 13/456,812

(22) Filed: Apr. 26, 2012

(65) Prior Publication Data
US 2012/0274079 A1 Nov. 1, 2012

Related U.S. Application Data

(60) Provisional application No. 61/479,044, filed on Apr. 26, 2011.

(51) Int. Cl.
F03B 13/00 (2006.01)
H02K 7/18 (2006.01)
F03B 17/02 (2006.01)

(52) U.S. Cl.
CPC .............. *H02K 7/1823* (2013.01); *F03B 17/02* (2013.01); *Y02E 10/20* (2013.01)

(58) Field of Classification Search
USPC ......................................................... 290/1 R
See application file for complete search history.

(56) References Cited

U.S. PATENT DOCUMENTS

| 4,206,608 A | * | 6/1980 | Bell | 60/698 |
| 7,411,308 B2 | * | 8/2008 | Parmley | 290/1 R |
| 8,816,517 B2 | * | 8/2014 | Ogaz | 290/1 E |
| 2012/0119510 A1 | * | 5/2012 | Herzen et al. | 290/1 C |
| 2014/0327247 A1 | * | 11/2014 | Calabro | 290/4 C |

FOREIGN PATENT DOCUMENTS

| CN | 102022252 A | * | 4/2011 |
| GB | 2326916 A | * | 1/1999 |
| WO | WO 9631696 A1 | * | 10/1996 |
| WO | WO 9701707 A1 | * | 1/1997 |
| WO | WO 03076798 A1 | * | 9/2003 |
| WO | WO 2013040624 A1 | * | 3/2013 |

* cited by examiner

*Primary Examiner* — Joseph Waks
(74) *Attorney, Agent, or Firm* — Bradford E. Kile; Kile Park Reed & Houtteman

(57) ABSTRACT

A multi-source passive energy power generation system that includes use of solar radiation to drive an air compressor and compressed air is then delivered to a power wheel positioned within a fluid tank. The air pressure is delivered to air chambers mounted upon tubular spokes of the power wheel and buoyancy force is used to drive rotation of the power wheel within the fluid tank. In some embodiments weights are added to translate along the tubular spokes under the guidance of cam surfaces to a rotational force to the power wheel from the force of gravity.

20 Claims, 11 Drawing Sheets

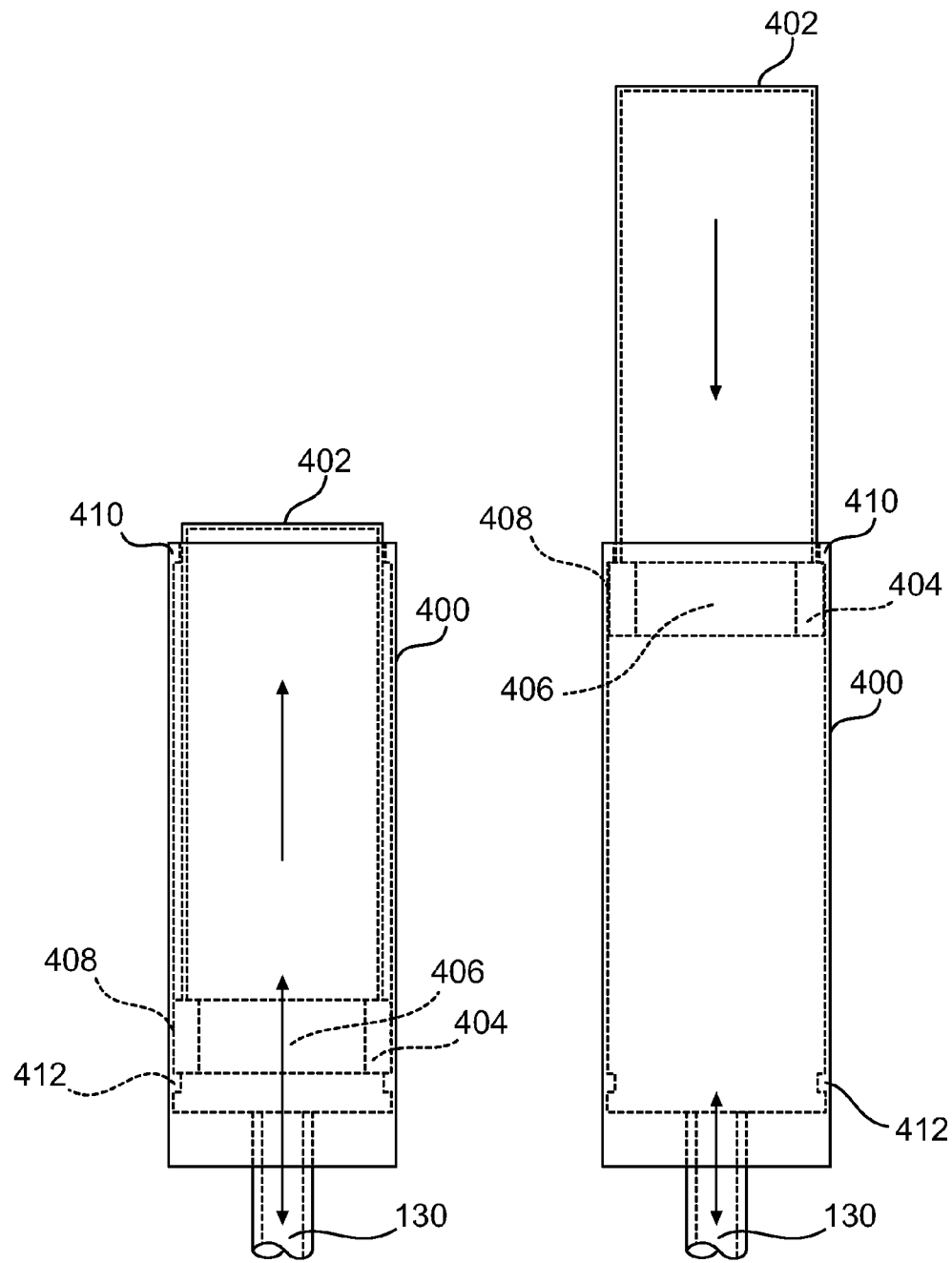
FIG. 10  FIG. 11

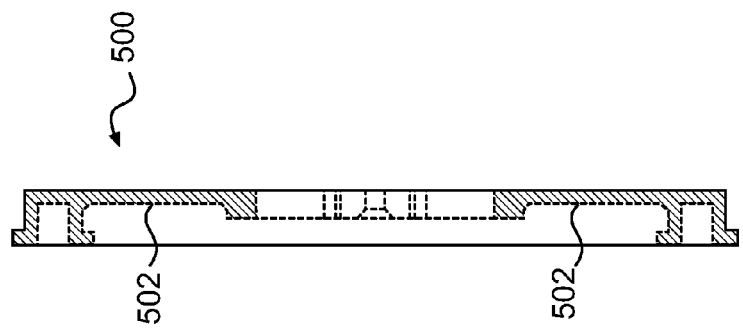
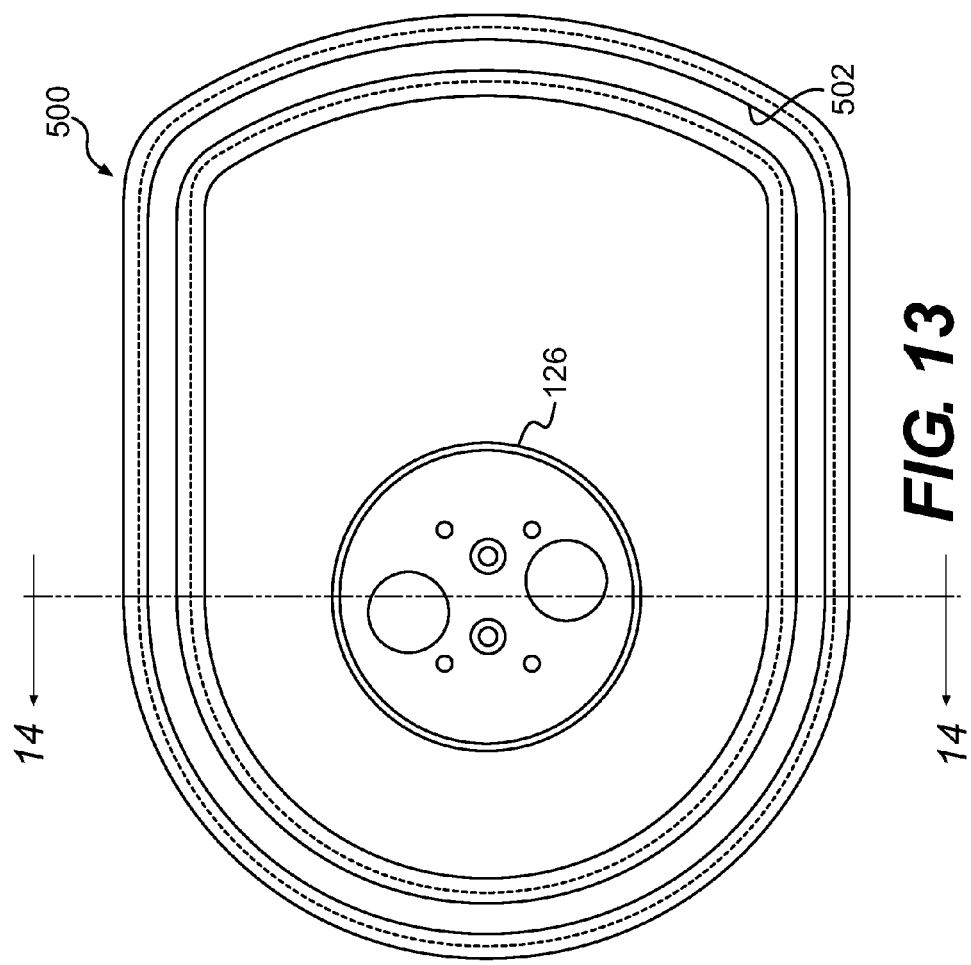

MULTI-SOURCE PASSIVE ENERGY POWER GENERATION

CROSS REFERENCE TO RELATED APPLICATION

This application claims the priority of applicant's U.S. Provisional Application Ser. No. 61/479,044 filed on Apr. 26, 2011. The disclosure of applicant's Provisional Application is hereby incorporated by reference as thought set forth at length.

BACKGROUND OF THE INVENTION

This invention relates to a system for generating power from multiple sources of natural energy. More specifically, the invention uses naturally occurring passive sources of energy such as solar radiation, gravity and buoyancy to create useable power.

In the past fossil fuel sources have been a primary source of usable energy. In this coal, oil and natural gas have been used in power plant installations to heat water which is converted into steam that drives massive turbines which in turn rotate generators to produce electricity. Fossil fuel sources, however, have certain disadvantages as a natural resource that is not without limit as well as producing environmental contaminates and concerns. Moreover significant reserves of fossil fuels exist outside of the territorial United States making reliable supply at reasonable costs problematic and subject to spikes based on geophysical, political and financial speculation considerations. Such uncertainty places economic development in the hands of sources and resources that may not be reliable or trustworthy.

Alternative sources of energy are available such as direct solar power, wind power, ocean current and tide machines. Each of these mono-sources of energy and power have their own advantages and disadvantages such as construction costs, efficiency, generation location, etc.

Although nuclear power generation has been proven to be reliable in most situations in instances of hundred year natural disasters, or just plain negligent human management of facilities, unforeseen events may produce unanticipated catastrophic consequences that can endanger human existence in significant regions of the earth for generations. Moreover safe and reliable management of spent fuel rods with long half-lives creates issues of their own complexity.

It would be highly desirable to provide a system and method of power generation for use in a wide variety of applications that would be reliable, not dependent on fossil or nuclear fuels and have an enhance efficiency in operation. Moreover utilization of universally available, reliable, multiple sources of passive energy such as solar, buoyancy and gravity to produce power would be desirable.

The problems suggested in the preceding are not intended to be exhaustive but rather are among many which may tend to reduce the effectiveness, reliability and safety of power generation systems known in the past. Other noteworthy problems may also exist; however, those presented above should be sufficient to demonstrate that power generation systems and methods appearing in the past will admit to worthwhile improvement.

BRIEF SUMMARY

A preferred embodiment of the invention which is intended to address concerns and accomplish at least some of the foregoing objectives comprises a system wherein solar energy is used to drive an air compressor which in turn delivers air under pressure to a buoyancy/gravity power wheel. The power wheel is mounted within a tank filled with a fluid having a specific gravity greater than air pressure and on a generally right hand side of the wheel gravity is used to drive rotation of the wheel in a clockwise direction and on a left hand side of the wheel buoyancy is used to drive rotation of the wheel also in a clockwise direction. An output shaft is operably connected to the wheel and can be used to drive an electrical generator or other devices where rotary power is desired. In a preferred embodiment all three passive energy sources of solar radiation, gravity and buoyance are combined to produce rotary power.

THE DRAWINGS

Numerous advantages of the present invention will become apparent from the following detailed description of preferred embodiments taken in conjunction with the accompanying drawings wherein:

FIG. 10 is a side elevation view of yet another embodiment of the invention comprising two telescoping cans in a collapsed condition mounted upon the distal end of an air induction and eviction spoke;

FIG. 11 is a side elevation view similar to FIG. 10 and discloses the cylindrical cans in an extended position;

FIG. 13 is a detailed side view of a continuous cam surface used to control the position of weights as illustrated in FIG. 12; and FIG. 14 is a cross-sectional view taken along section line 14-14 in FIG. 13.

DETAILED DESCRIPTION

Figure 1:
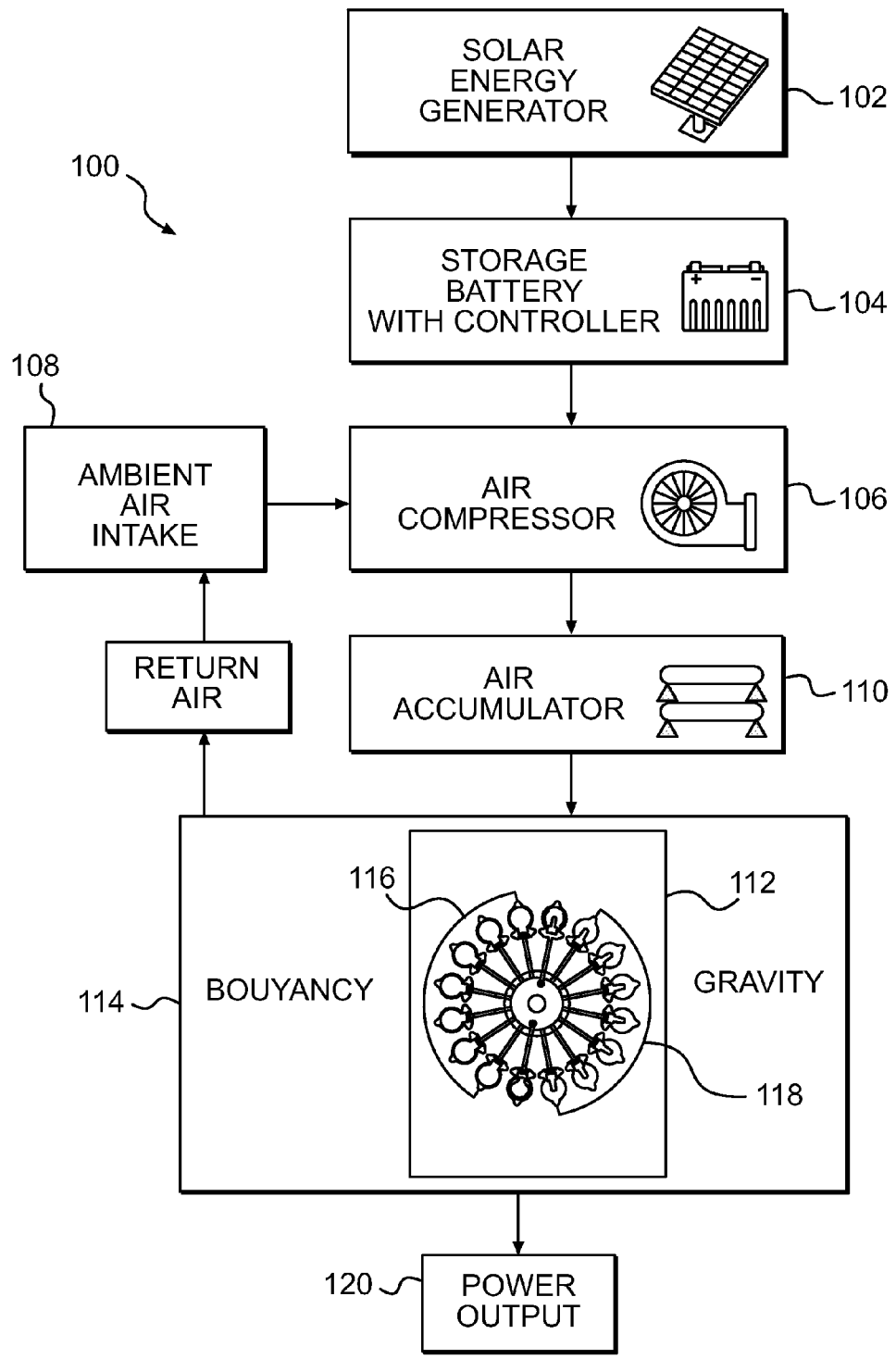
FIG. 1 is a schematic diagram of a multi-source passive power generation system in accordance with one embodiment of the invention that utilizes the passive energy of buoyancy, gravity and in some instances solar to generate rotational output power.

Referring now particularly to the drawings, wherein like reference characters refer to like parts, and initially to FIG. 1, there will be seen a schematic illustration of a preferred embodiment of the subject multi-source passive energy power generation system 100.

A conventional solar energy source 102 is operable to convert solar radiation into direct current which is fed to a storage battery with a controller 104. The battery in turn is used to drive an air compressor 106. Ambient air is drawn into the compressor 106 from an ambient air intake 108 where the air is compressed and delivered to an accumulator 110 which is used as a steady source of air pressure of say three pounds per square inch above ambient air pressure. Alternatively a converter could be used to generate AC current to drive an air compressor pump.

Air pressure from the accumulator 110 is delivered to a buoyancy and gravity power wheel 112 mounted for rotation within a fluid tank 114 where the air pressure is used on a buoyancy side 116 of the power wheel 112 to rotate the wheel in a clockwise direction within the tank 114. In one embodiment exhaust air from the power wheel is fed back into the air compressor intake 108 via a check valve system.

In another embodiment of the invention clockwise buoyancy drive of the power wheel 112 is enhanced by the provision of gravity weights (to be discussed in detail below) which function to provide a clockwise gravity drive 118 on the right hand side of the power wheel 112.

A power output shaft 120 is coupled to the power wheel 112 and is used to drive an electrical generator or a variety of devices where rotary power is desired. In a preferred embodiment three passive sources of energy namely solar radiation, buoyancy and gravity are combined to drive the power wheel 112.

Figure 2:
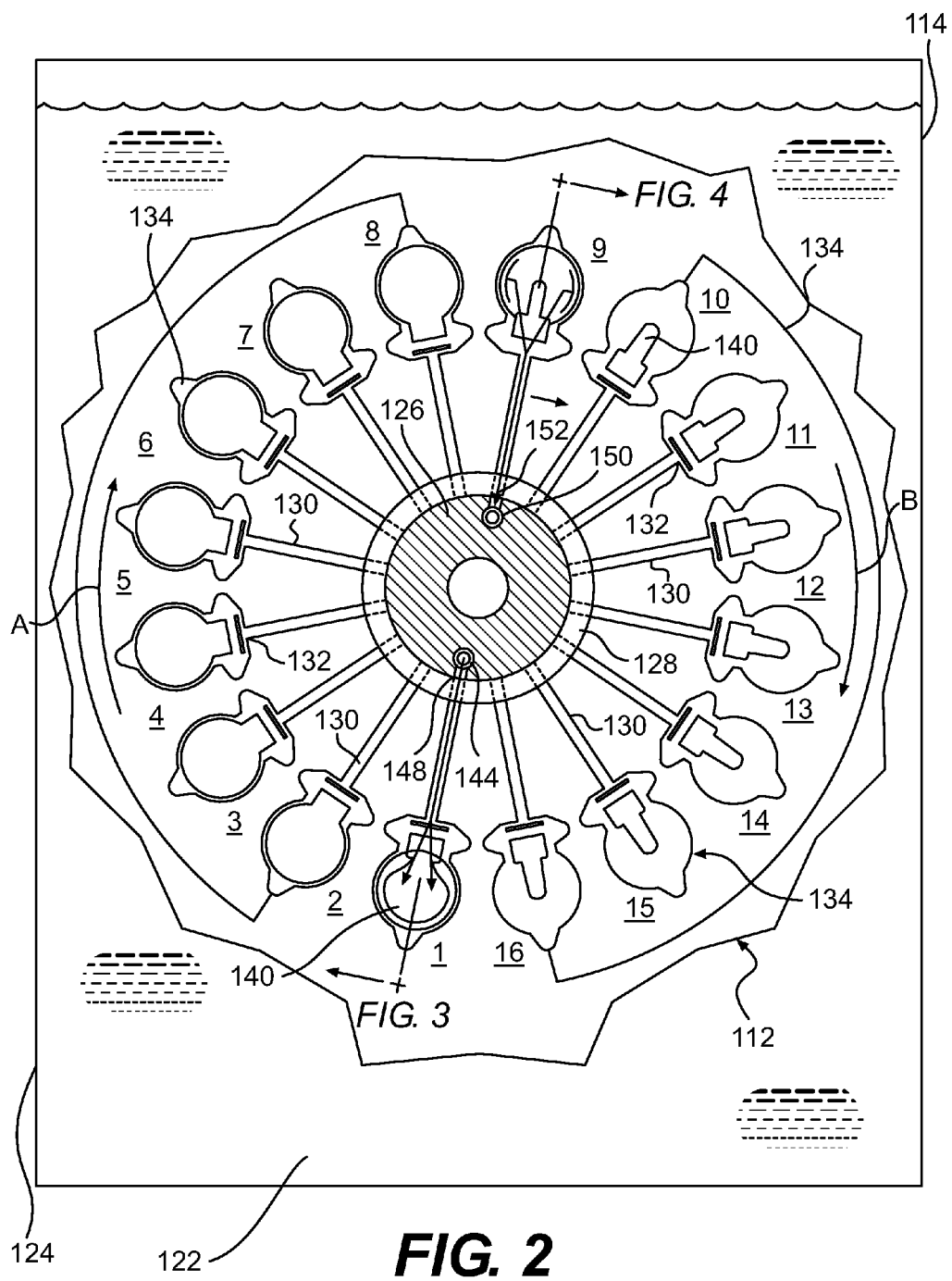
FIG. 2 is a side elevation view of multi-source passive power generation system in accordance with one embodiment of the invention that comprises a buoyancy wheel positioned within a fluid container.
Figure 3:
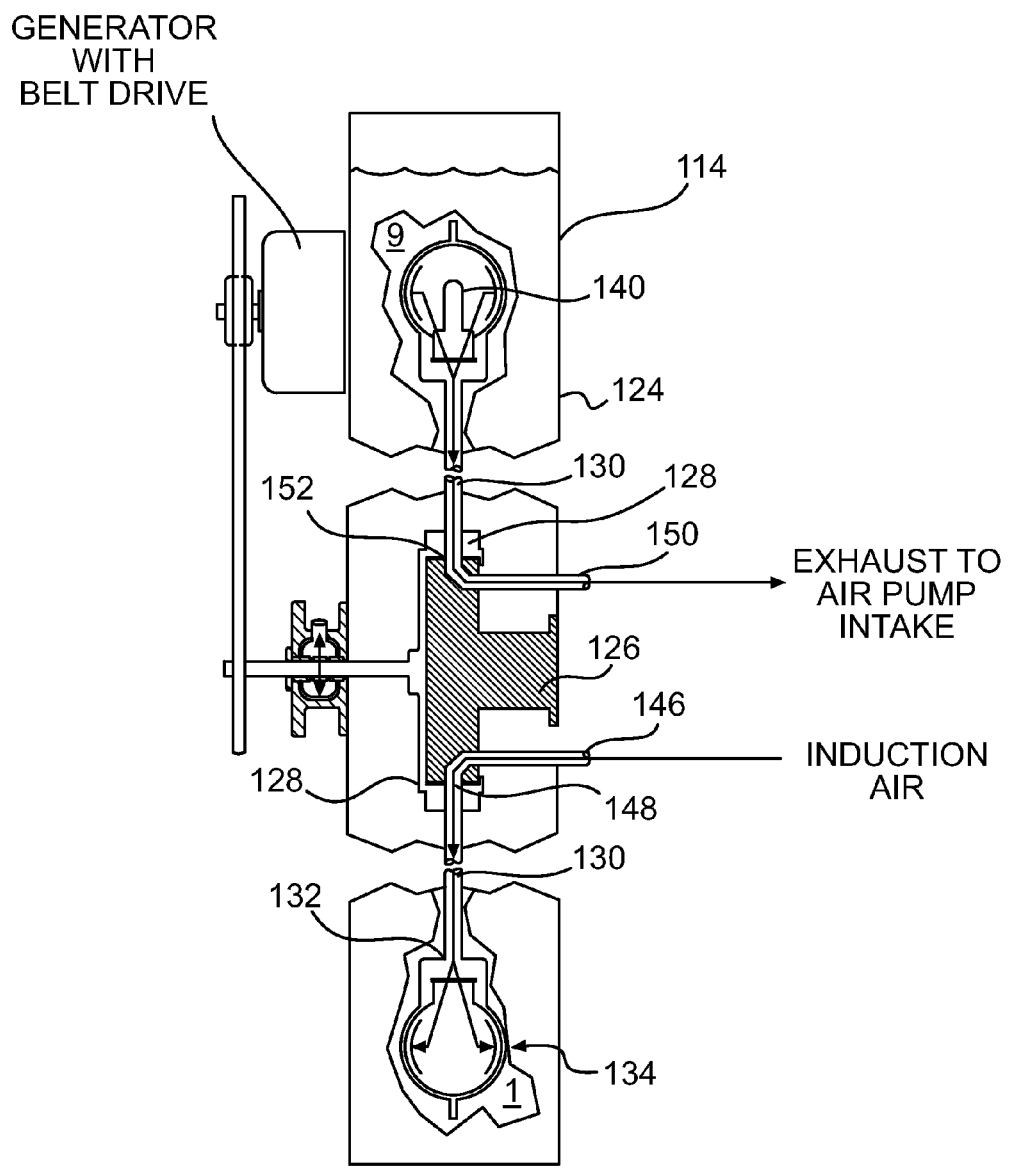
FIG. 3 is a partial side elevation view taking in the direction of section lines 3-3 in FIG. 2 and discloses an axle mounted upon a side wall of a fluid tank and a wheel hub journaled to the axle and being joined to an output shaft of the buoyancy engine in FIG. 3.
Figure 4:
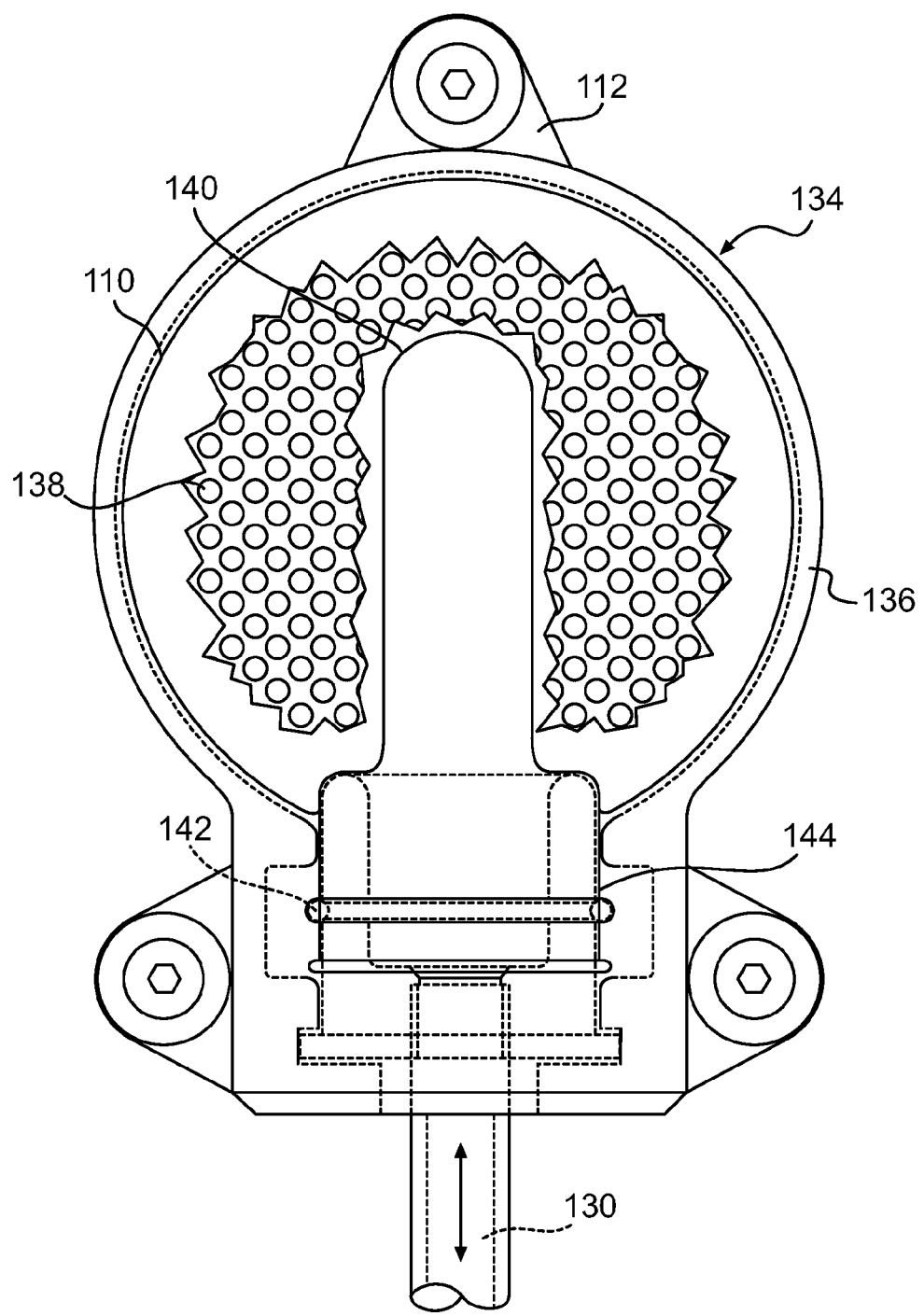
FIG. 4 is a partial detailed cross-sectional view taken along section lines 4-4 in FIG. 2 of one generally spherical buoyancy chamber of the plurality of buoyancy chambers disclosed in FIG. 2.

Turning now to FIGS. 2-4 there will be seen various views of a power wheel 112 which operates on air pressure from an accumulator 110 as discussed above. The power wheel is positioned within a generally rectangular fluid tank 114 having a generally rectangular bottom surface 122 and side walls 124. The tank is filled 114 is preferably filled with water but other fluids are envisioned that have a specific gravity of greater or less than that of water but in any event greater than the fluid, such as air under pressure, supplied to the tank from the accumulator 110.

As shown in FIGS. 2 and 3 positioned centrally within the tank 114 is a rotary power wheel 112. An axle 126 is mounted upon a side wall 124 of the tank 114 in a generally central location and extend into the tank. A hub 128 of the rotary power wheel 112 is journaled upon the axle 126 for rotation in a clockwise direction as viewed in FIG. 2.

Attached to the hub 128 are a plurality of radially extending tubular spokes 130 which are positioned with equal spacing around the hub 128. In a preferred embodiment of the invention there are sixteen equally spaced spokes positioned around the outside diameter of the hub (equally spaced by approximately 22.5 degrees). Each of the tubular spokes 130 are hollow tubes and have a proximal end 132 radially mounted within the hub 128 and a distal end that terminate into an air chamber 134. In a presently preferred embodiment there are sixteen tubular spokes and air chambers that are shown numbered in FIG. 2 with the number "1" being assigned to the position slightly beyond a six o'clock position and extending in clockwise sequence around the power wheel to position "16" which is slightly short of a six o'clock position on the power wheel.

Turning now specifically to FIG. 4 a generally spherical buoyancy chamber 136 is mounted at the distal ends of the tubular spokes 130. The spherical buoyancy chamber 136 has spherical side walls with a plurality of apertures 138 that permit free generally unrestricted access to the surrounding fluid within the tank 114. Within the interior of each spherical buoyancy chamber 136 is a flexible bladder 140 that is operably connected to the distal end of a corresponding tubular spoke 130 and is operable to receive and return air from the interior of the flexible bladder. The bladder may be held in a secure position by an "O" ring 142 mounted about an opening of the bladder and a mounting ring 144 of the spherical chamber.

The bladder is preferably composed of a plastic composition with a wall thickness suitably selected to repeatedly receive and evict air from within the interior of the spherical air chamber. As a general proposition there is no requirement for the bladder to be elastic although in certain embodiments using an elastic composition may be desirable. In any event the bladder should be suitable to be deployed within the inter periphery of the spherical chamber 136 or contract to a completely collapsed condition during each full rotation of the power wheel.

Returning to FIG. 3 an air, or other fluid, induction conduit 146 extends through the side wall of the tank 124 and into the stationary axle 126. This induction conduit 146 terminates in a radially extending fluid port 148 in the axle 126. When the hub 128 rotates to bring a proximal end of a tubular spoke into registry with the fluid port 148 fluid, such as air under pressure, will be injected into the bladder 140 which will fill the spherical chamber 136. The fluid induction port is peripherally positioned on the axle at the "1" position as viewed in FIG. 2. When fluid from the tank 114 is evicted from the spherical chamber 134 at the "1" position a buoyancy force is created at the distal end of the tubular spoke 130 and the power wheel is rotated in a clockwise direction as illustrated by arrow "A" in FIG. 2.

As the air chamber sphere moves clockwise to position 2 and beyond the port of the spoke 130 moves out of registry with the induction port 148 and the hub and axle form a seal so that buoyancy is maintained within the spherical air chamber as the power wheel rotates. As noted above the buoyancy of the bladder applied at the distal end of spoke 130 tends to rotate the power wheel in a clockwise direction at positions "1" through "8." Each of the spherical buoyancy chambers and interior bladders 140 are inflated on the left hand side of the power wheel and remain inflated thus providing clockwise rotational torque to the power wheel 112 on the left hand side of the power wheel by the passive force of buoyancy.

Returning to FIG. 3 a fluid exhaust line 150 is positioned through a side wall of the tank 114 and projects into the axle 126 in a position approximately diametrically opposite to the fluid inlet line 146. The exhaust line 150 terminates within the axle with a radially extending port 152. When rotation of the power wheel 112 brings the proximal end of a tubular spoke 130 into registry with the exhaust port 152 fluid, such as air under pressure, is evicted from the bladder of the buoyancy chamber and the bladder collapses within the buoyancy chamber. At this point the air chamber 136 loses the upward buoyancy it possessed and the power wheel 112 is freed to continue rotation in a clockwise direction in the direction of arrow "B" through stations "9" through "16." When station "1" is reached the process is repeated.

Turning now to FIGS. 5 through 8 another embodiment of the invention is disclosed. This embodiment is similar to the embodiment of FIGS. 2-4 and like parts are designated with identical reference numbers. In this embodiment a gravity system has been added to the buoyancy drive system of the embodiment of FIGS. 2-4.

Figure 7:
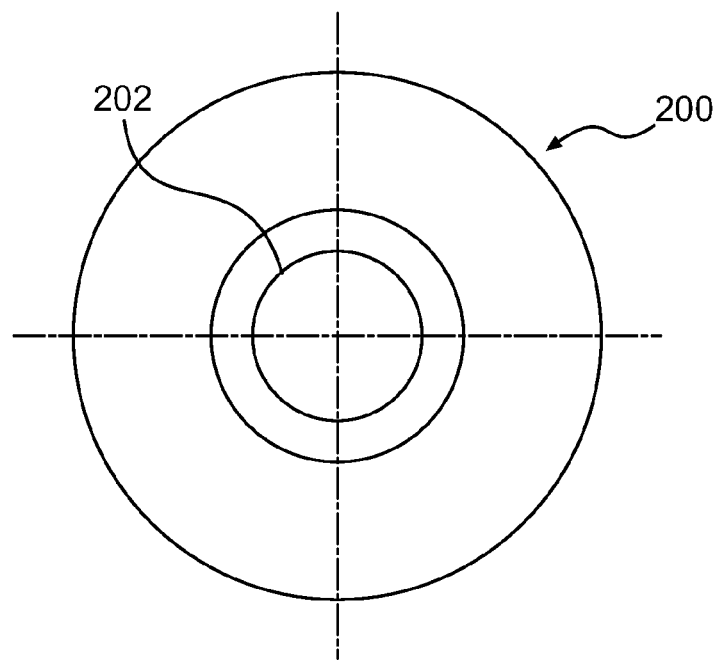
FIG. 7 is a top view of a weight operably mounted upon each air induction and eviction spoke of the embodiment of the system disclosed in FIGS. 5 and 6.
Figure 8:
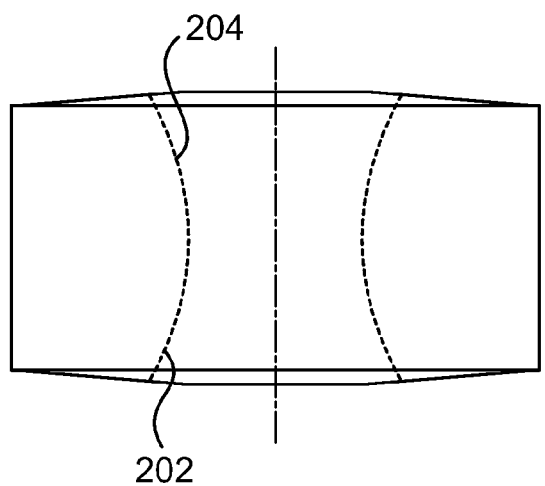
FIG. 8 is a side view of a weight as shown in FIG. 7.

In this embodiment a generally torus shaped weight 200 has been added to surround and slid along each of the tubular spokes 130. A detailed view of each weight is shown in FIGS. 7 and 8. Each of the weights 200 has a generally puck shape with a central aperture. Each of the torus shaped weights can be composed of a heavy metal such as lead and is preferably enrobed with a low friction plastic coating 204 such as polytetrafluoroethylene.

Figure 5:
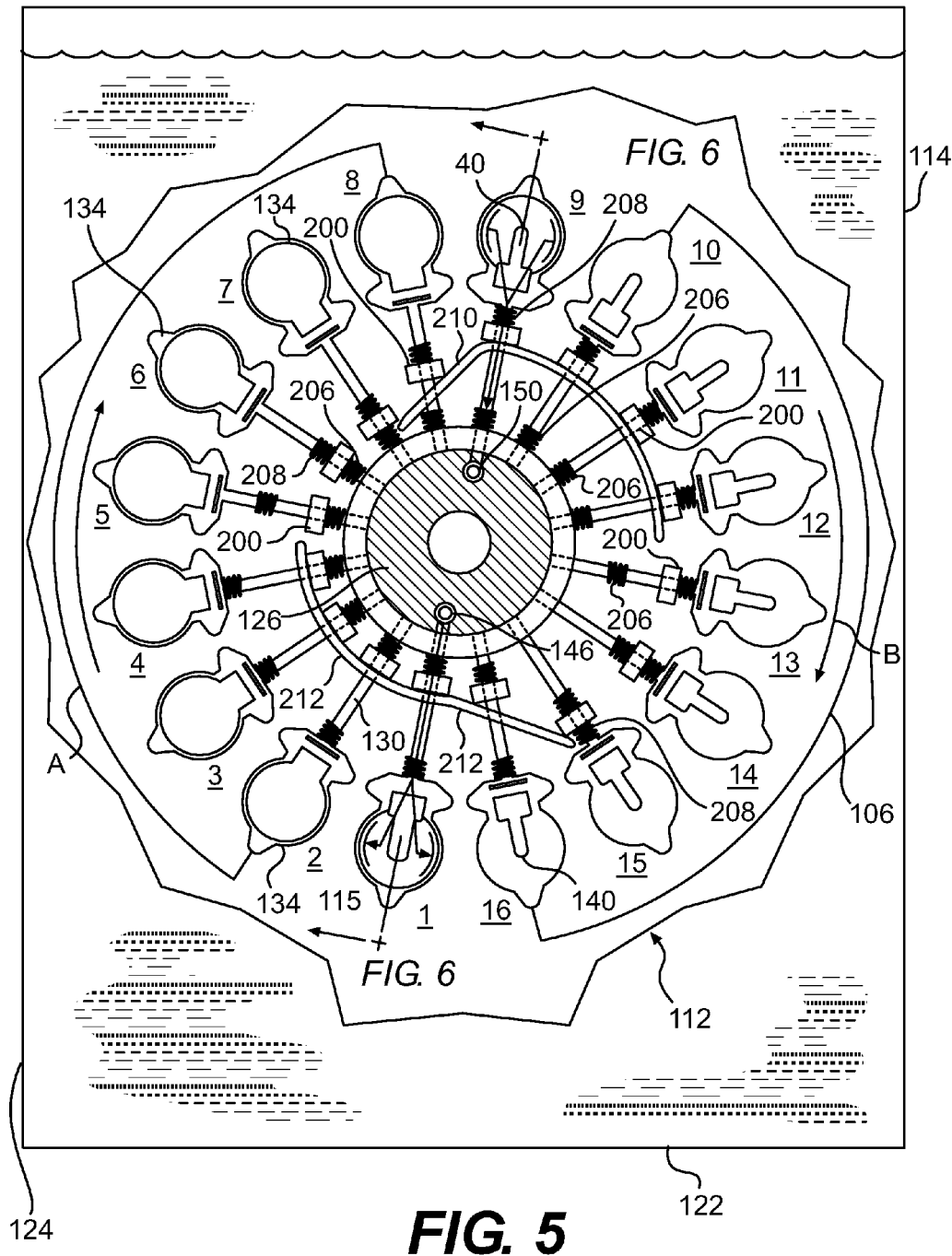
FIG. 5 is a side elevation view of another embodiment of the invention depicted in FIG. 2 that further includes gravity weights and cam surfaces to combine use of gravity along with buoyancy to produce rotational power for the system.
Figure 6:
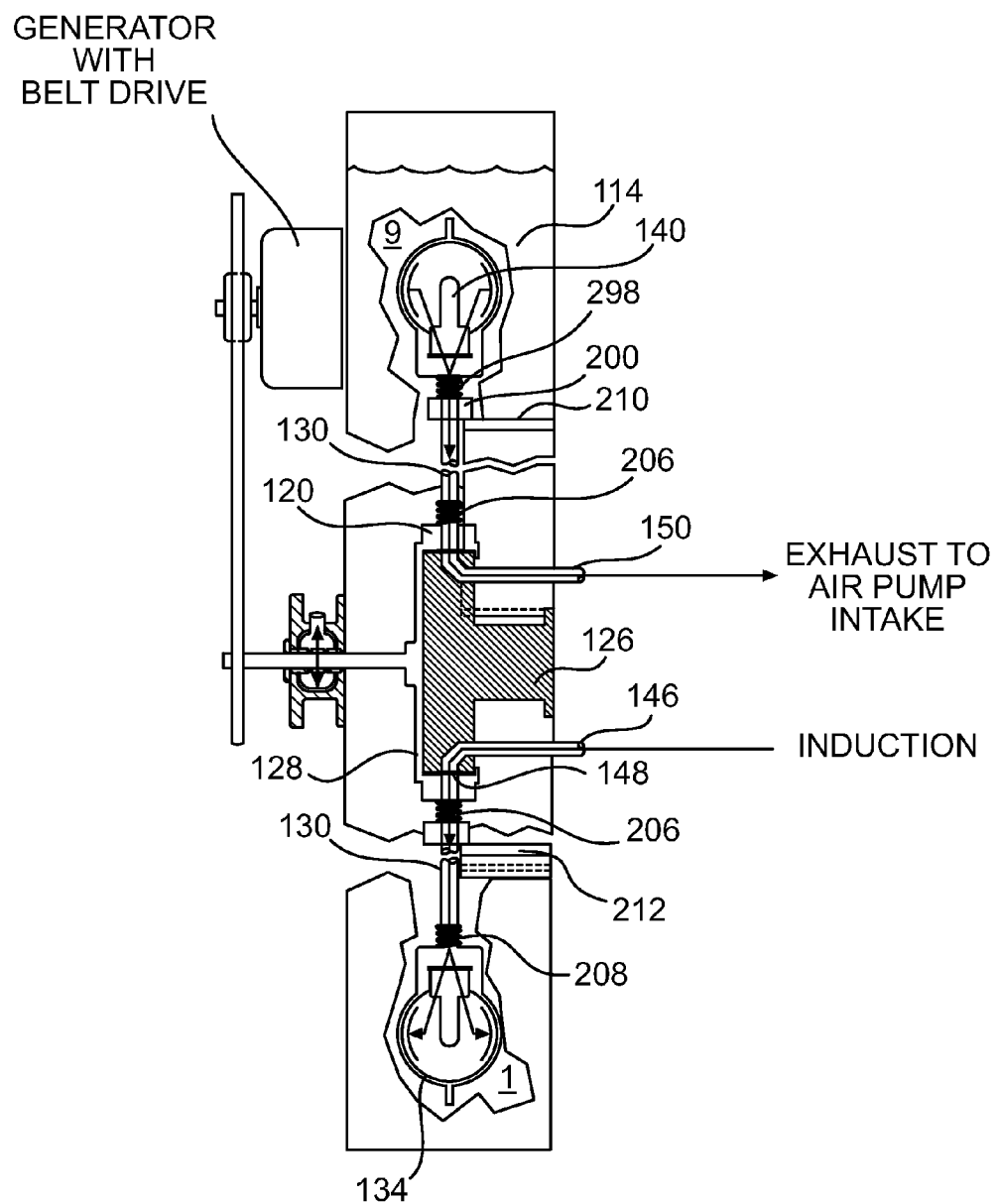
FIG. 6 is a cross-sectional side view of the embodiment of FIG. 5 taken along section lines 6-6 in FIG. 5; detailed plan view and a cross-sectional view of an air bearing pillow as previously illustrated in FIG. 5 positioned around the buoyancy engine output shaft.

As shown in FIG. 5 each of the tubular spokes 130 is fitted with one or more of the weights 200 and each spoke also carries a radial inner spacer sleeve 206 and a radial outer spacer sleeve 208.

An upper cam surface 210 is mounted upon the wall of the tank 114 and extends in curved posture from an initial position adjacent to an inner edge of a weight 200 at station "7" and extends to a position slightly beyond station "12." The upper cam surface 210 serves to extend the weights 200 to a radially outermost position upon each spoke from station "9" to approximately station "12" where gravity tends to keep the weight extended to station "15." In an extended position the weights are extended in an outermost posture upon the radial tubular spokes from station "9" to station "15" and thus create a clockwise moment on the hub 128 which serves to rotate the hub in a clockwise direction in the direction of arrow "B."

In addition to the upper cam surface 210 discussed above a lower cam surface 212 is mounted upon the wall of the tank 114 and extends in a curved posture from an initial position adjacent to an outer surface of a weight 200 at station "15" and extends in a clockwise direction about the power wheel 112 in a radially decreasing posture to a position slightly beyond station "4."

The cam surface 212 serves to engage an outer edge of a weight 200 at approximately station "15" and raise the weight to a position adjacent the hub 128 while the power wheel 112 rotates in a clockwise direction from station "16" to station "7."

It will be seen in FIG. 5 that the cam surfaces 210 and 212 create a longer moment arm for the weights 200 on the right had side of the power wheel and thus operably combine with the left had buoyancy side of the power wheel to rotate the power wheel in a clockwise direction.

Figure 9:
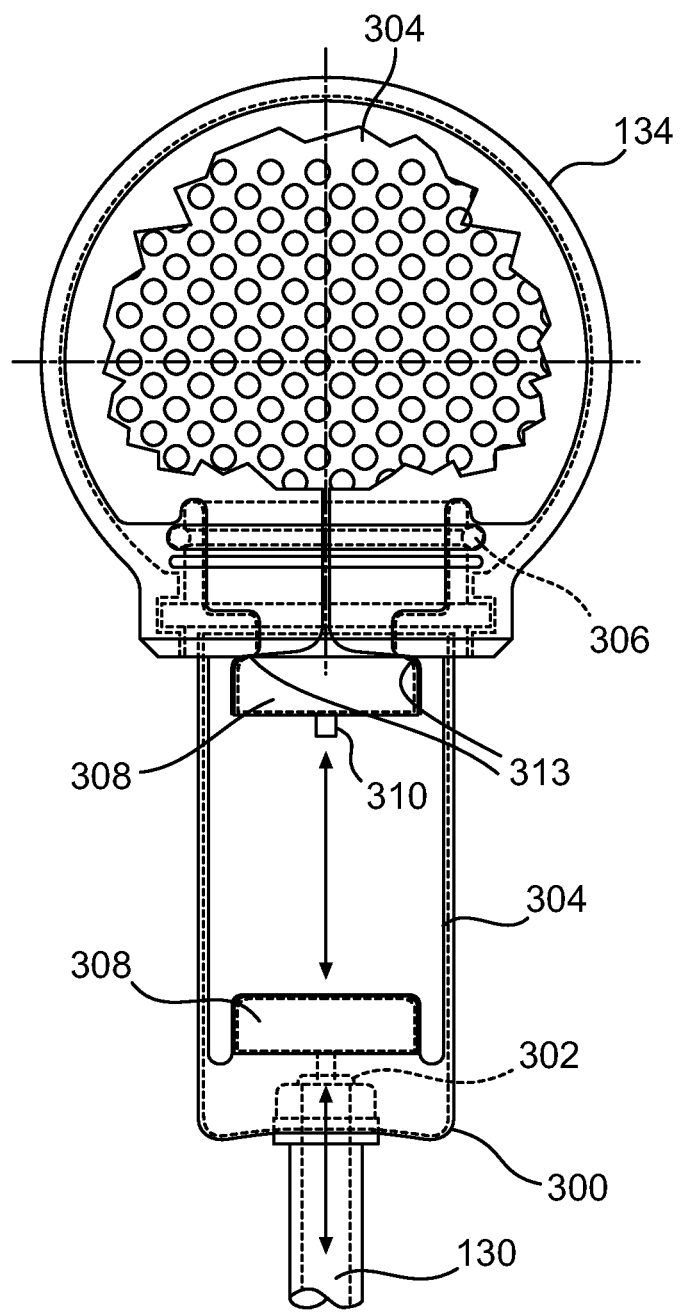
FIG. 9 is a partial side cross-sectional view of another embodiment of the invention that comprises a cylinder and generally spherical chamber mounted at the distal end of each air induction and eviction spoke of the passive power drive system.

FIG. 9 discloses another embodiment of the invention. In this embodiment the concept of a buoyance bladder is combined within a rigid cylindrical chamber 300 mounted on the distal end of each engine wheel spoke 130. The attachment structure 302 at the base of the cylinder is open centrally to permit communication with the air induction and exhaust spoke 130. A flexible bladder or cylindrical balloon 304 is mounted at one end 306 at an open end of the cylinder 300 and carries a disc 308 at a closed end of the bladder. The disc 308 prevents the bladder 304 from being drawn into the tubular spoke 130 during an exhaust phase. A bar 310 attached to a base of the disc 308 prevents the disc from completely closing the distal end of the tubular spoke 130.

The bladder 304 and disc 308 are mounted to traverse back and forth within the cylinder 300. FIG. 9 shows the disc 308 and bladder 304 is a contracted position with solid lines as would exist at the station "9" position to station 16 position of the engine wheel. Beyond the station "1" position air pressure will extend the bladder or balloon 304 to an extended position within the sphere until the disc 308 engages a stop 312 at a distal end of the cylinder 300 and the bladder 304 extends into the spherical buoyancy chamber 134.

Turning now to FIGS. 10 and 11 another embodiment of the invention is disclosed. FIG. 10 discloses an embodiment which is similar to the embodiment of FIG. 9 but instead of using a flexible bladder 304 this embodiment comprises two rigid cylindrical cans 400 and 402 that are open ended and telescope together.

In FIG. 10 a fixed cylindrical can 400 is shown mounted on a distal end of an air induction and exhaust spoke 130. A disc 404 is positioned at an open end of the traversing can 402. The disc 404 includes a central opening 406 or a plurality of transverse holes as desired. The central opening 406 or the plurality of holes or apertures allows air pressure to equalize on either side of the disc 404.

Bearings 408 and stops 410 and 412 enable controlled relative translation of the can 402 with respect to the fixed can 400. In operation the cans are generally in a contracted position at one to three o'clock and then telescope open by gravity and air pressure to fully extended position from station "1" to approximately station "9" where the air pressure is exhausted in a manner of operation similar to the operation of the embodiment of FIG. 9. The size of the cylindrical chambers can be selected to produce a desired buoyancy to provide a clockwise rotation of the engine wheel in the direction of arrow "A' in FIG. 2.

Figure 12:
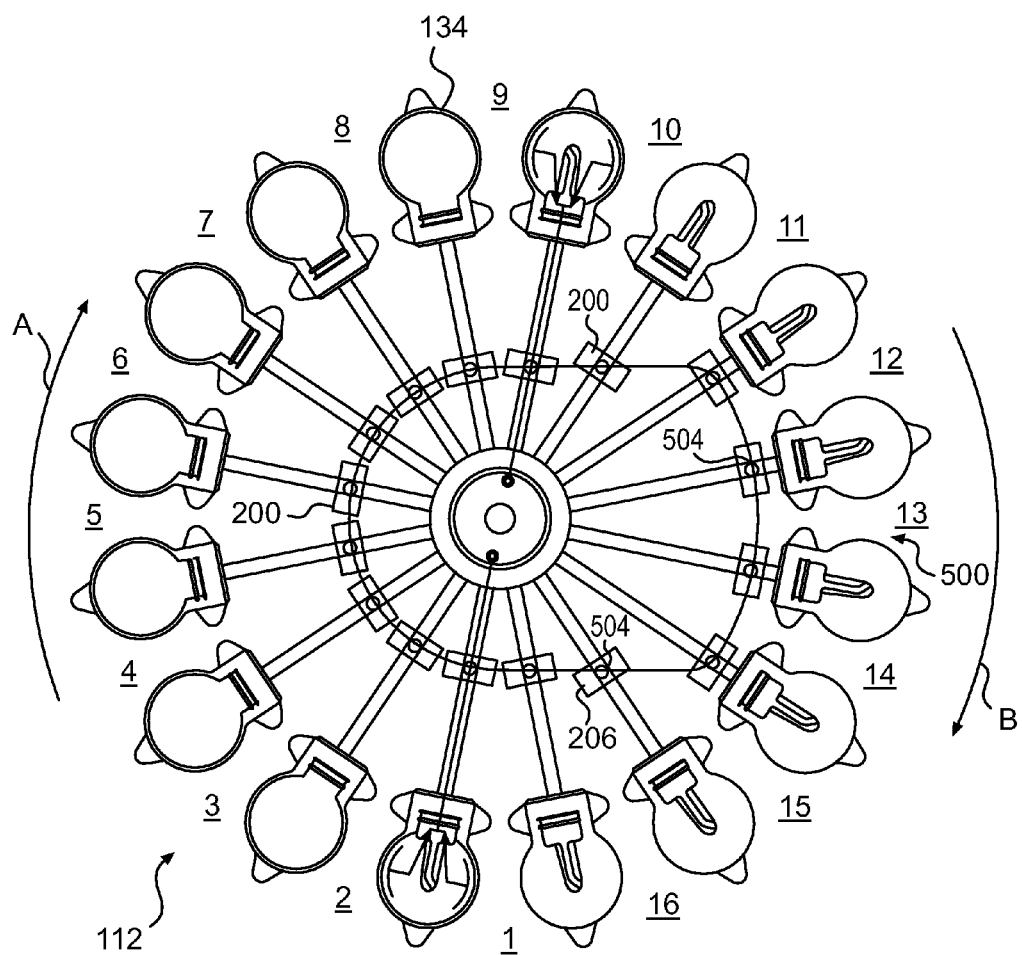
FIG. 12 is a partial side elevation view of a yet still another embodiment of the invention that includes a continuous cam race for control of weights mounted for translation along the air induction and eviction spokes of the buoyancy and gravity power wheel.

Referring now to FIGS. 12 through 14 there is yet another embodiment of the subject invention. FIG. 12 is a schematic of the power wheel 112 disclosed in FIG. 5. In this embodiment a continuous cam 500 is shown. This cam surface interacts with weights 200 that are mounted for translation along the tubular spokes 130 as discussed in connection with FIG. 5.

FIG. 13 is a side elevation view and FIG. 14 is a cross-sectional view of the cam 500 which is mounted upon the axle 126 and includes a cam track 502 that is designed to operate in cooperation with a cam follower arm 504 that is connected to a side surface of the weights 200. As the power wheel turns clockwise the weights will be extended at stations "11" through "14" and contract at stations "16" through "9." This imbalance in the length of the moment arms of the weights 200 induces clockwise rotation of the power wheel in the direction of arrow "B" on the right hand side of the power wheel in combination with the buoyancy force in the direction of arrow "A" on the left hand side of the power wheel.

The spherical expandable bladder containment basket 134 can be constructed from composite materials such as ABS and molded in two hemi-spherical halves. The fluid containment tank 114 can be any size as desired and the system scaled up or down to meet the intended function. In addition the amount of air press necessary to expand the collapsible bladder will depend on the depth of the water with the vessel as approximately one meter of water is equal to one atmosphere of air pressure.

Although a single power wheel is illustrated it is envisioned that a plurality of wheels can be mounted in parallel upon a single central hub shaft to provide multiples of the power generation of a single engine power wheel. Moreover the dimensions and weights can be selected to optimize the resulting power output from buoyancy and gravity for a given size container or vessel.

In this patent the term "passive" has been used to describe a source of energy that exists in nature such as solar radiation, buoyancy and gravity. These sources of energy exist and it is the purpose of the subject invention to utilize those sources to produce useful power for a variety of applications. The presently envisioned fluid supplied to the power wheel is air under pressure such as for example 3 psi above ambient air pressure. Other sources of pressure are envisioned, however, such as for example steam. The term "approximately" as used in this patent is intended to provide a degree a latitude with respect to any component that includes the term in its description.

The functions and advantageous of the subject systems provide a source of power generation that is relatively quiet, environmentally save, is independent of fossil fuel sources, and is efficient in operation. Although one of ordinary skill in the art will recognize numerous uses of the subject efficient energy generation systems currently envisioned uses include electricity generators, air compressors, hydraulic drives, pumps, sawmills, textile mills, turbines, machinery with line shafts, electrical vehicle charging, well drilling, oil refineries, road construction sites to compress air or provide an independent source of electricity, electrical power of the energy grid, etc.

In the specification the expression "approximately" is intended to mean at or near and not exactly such that the exact location is not considered critical.

In the claims reference has been made to use of the term "means" followed by a statement of function. When that convention is used applicant intends the means to include the specific structural components recited in the specification and the drawings and in addition other structures and apparatus that will be recognized by those of skill in the art as equivalent structures for performing the recited function and not merely structural equivalents of the structures as specifically shown and described in the drawings and written specification.

In describing the invention, reference has been made to preferred embodiments. Those skilled in the art however, and familiar with the disclosure of the subject invention, may recognize additions, deletions, substitutions, modifications and/or other changes which will fall within the scope of the invention as defined in the following claims.

What is claimed is:

1. A multi-source passive power generation system comprising:
    an open top fluid tank having,
    a bottom, and side wall surfaces, and being operable for containing a fluid within said tank having a density greater than surrounding ambient air;
    an axle mounted within said fluid tank and having a central longitudinal axis lying generally parallel to but spaced from said bottom of said tank;
    a power wheel mounted for rotation upon said axle within said fluid tank said wheel extending generally perpendicular to said bottom surface of said fluid tank, said wheel having,
    a hub mounted for rotation upon said axle,
    a plurality of tubular spokes radially mounted at proximal ends upon said hub and radiating away from said hub to distal ends, said plurality of tubular spokes having an imaginary twelve o'clock to six o'clock to twelve o'clock positions about said hub, and
    an air chamber mounted upon the distal ends of each of said plurality of tubular spokes for selectively receiving air under a pressure greater than ambient air pressure and selectively evicting air under pressure from said air chamber;
    a source of air under pressure greater than ambient air pressure surrounding said fluid tank;
    an air inlet passage extending through said axle and connected to said source of air under pressure greater than ambient air pressure surrounding said tank for inducting air under pressure into said air chambers as said power wheel rotates and said tubular spokes are brought into registry with said air inlet passage;
    an air outlet port extending through said axle for evicting air under pressure away from within said air chambers and away from said fluid tank when said tubular spokes mounted upon said hub of said power wheel rotates into registry with said air outlet passage;
    and a power output shaft connected to said hub for rotation with said hub and extending through said side wall of said tank for delivering rotary energy to a desired receptor, wherein air under pressure is injected into each of said air chambers when the hub position of each of said radial spokes comes into registry with said air inlet port at approximately just beyond a six o'clock position to create positive buoyancy within said air chambers and induce a clockwise rotary motion of said power wheel within said fluid tank and air under pressure is evicted from said air chambers just beyond a twelve o'clock position when each of said radial spokes comes into registry with said air outlet port extending through said axle to evict air from within said air chamber and permit said air chamber to continue rotation in a clockwise direction back to said air inlet passage.

2. A multi-source passive power generation system as defined in claim 1 and further comprising:
    a solar energy generator for generating direct current;
    a storage battery connected to said solar energy generator;
    an air pump connected to and driven by said storage battery; and
    an accumulator connected to an outlet of said air pump for receiving air from said air pump and being connected to said air inlet passage to deliver air under pressure to said air inlet passage.

3. A multi-source passive power generation system as defined in claim 2 wherein:
    said air outlet passage is connected to an inlet of said air pump.

4. A multi-source passive power generation system as defined in claim 1 and further comprising:
    a weight connected to each of said tubular spokes, said weight serving to facilitate rotation by gravity of each of said tubular spokes from a position following eviction of air pressure from said air chambers to approximately a six o'clock position of said power wheel so that rotatory force of said power wheel is a combination of buoyancy force from approximately induction of air pressure into said six o'clock to twelve o'clock and gravity from approximately twelve o'clock to approximately six o'clock positions of said power wheel.

5. A multi-source passive power generation system as defined in claim 4 and further comprising:
    a cam surface connected to said side wall of said fluid tank and extending from approximately an eleven o'clock position to approximately a two o'clock position to extend said weights mounted upon each of said tubular spokes to a distal position on said spokes to facilitate rotation of said power wheel by gravity from approximately a position following eviction of air from said air chambers to approximately a six o'clock position of said power wheel; and
    a cam surface connected to said side wall of said fluid tank and extending from approximately a five o'clock position to approximately an eight o'clock position to contract said weights mounted upon each of said tubular spokes to a proximal position on said spokes to facilitate rotation of said power wheel by buoyancy from approximately a position following induction of air into said air chambers to approximately an eleven o'clock position of said power wheel.

6. A multi-source passive power generation system as defined in claim 4 and further comprising:
a cam surface connected to said side wall of said fluid tank and extending from approximately an eleven o'clock position to approximately a two o'clock position to extend said weights mounted upon each of said tubular spokes to a distal position on said spokes to facilitate rotation of said power wheel by gravity from approximately a position following eviction of air from said air chambers to approximately a six o'clock position of said power wheel;
a cam surface connected to said side wall of said fluid tank and extending from approximately a five o'clock position to approximately an eight o'clock position to contract said weights mounted upon each of said tubular spokes to a proximal position on said spokes to facilitate rotation of said power wheel by buoyancy from approximately a position following induction of air into said air chambers to approximately an eleven o'clock position of said power wheel;
a generally spherical shell connected to a distal end of each of said tubular spokes of said power wheel and having a plurality of ports throughout the shell surface to permit relative free ingress and egress of fluid from said fluid tank into and out of said generally spherical shell; and
a bladder connected to a distal end to each of said tubular spokes and positioned to expand and contract within said generally spherical shell.

7. A multi-source passive power generation system as defined in claim 6 wherein:
there are sixteen tubular spokes, spherical shells and weights comprising said power wheel.

8. A multi-source passive power generation system as defined in claim 4 wherein:
there are sixteen tubular spokes, sixteen air chambers and sixteen weights mounted for translation along said tubular spokes; and further comprising
a continuous race mounted upon the side wall of said fluid tank and being connected to each of said weights and being shaped such that full extension of said weights upon said tubular spokes is realized between approximately a two o'clock and four o'clock position and a full contraction of said weights upon said tubular spokes is realized between approximately a six o'clock and eleven o'clock position of said power wheel within said fluid tank.

9. A multi-source passive power generation system as defined in claim 1 wherein each of said air chambers comprises:
a generally spherical shell connected to a distal end of each of said tubular spokes of said power wheel and having a plurality of ports throughout the shell surface to permit relative free ingress and egress of fluid from said fluid tank into and out of said generally spherical shell; and
a bladder connected to a distal end to each of said tubular spokes and positioned to expand and contract within said generally spherical shell.

10. A multi-source passive power generation system as defined in claim 9 wherein:
there are at least four tubular spokes and air chambers connected to said hub of said power wheel.

11. A multi-source passive power generation system as defined in claim 10 wherein:
there are sixteen tubular spokes and air chambers connected to said hub of said power wheel.

12. A multi-source passive power generation system as defined in claim 9 and further comprising:
a cylindrical chamber between the distal end of each tubular spoke and an adjacent generally spherical shell; and
a weight is positioned for translation within said cylindrical chamber.

13. A multi-source passive power generation system as defined in claim 1 wherein said air chambers comprising:
a first cylindrical shell connected at one end to the distal end of said tubular spoke; and
a second cylindrical shell telescoped into an open end of said first cylindrical shell and having a closed outer end such that said second shell is operable to expand by telescoping upon introduction of air under pressure into said first cylindrical shell and contract upon eviction of air from said first cylindrical shell.

14. A multi-source passive power generation system as defined in claim 13 and further comprising:
a weight mounted upon a proximal end of said second cylindrical shell and being operable to translate as said second cylindrical shell telescopes into said first cylindrical shell.

15. A multi-source passive power generation system comprising:
an open to fluid tank;
an axle mounted within said fluid tank;
a power wheel mounted for rotation upon said axle within said fluid tank, said power wheel having,
a hub mounted for rotation upon said axle,
a plurality of tubular spokes radially mounted at proximal ends upon said hub and radiating away from said hub to distal ends, said plurality of tubular spokes having an imaginary twelve o'clock to six o'clock to twelve o'clock positions about said hub,
and air chamber means mounted upon the distal ends of each of said plurality of tubular spokes for selectively receiving air under a pressure greater than ambient air pressure and selectively evicting air under pressure from said air chamber means to provide buoyancy rotation of said power wheel within said fluid tank;
a source of air under pressure greater than ambient air pressure surrounding said fluid tank;
an air inlet passage extending through said axle and connected to said source of air under pressure for inducting air under pressure into said air chambers as said power wheel rotates;
an air outlet port extending through said axle for evicting air under pressure away from within said air chambers; and
a power output shaft connected to said hub for rotation with said hub and extending from said tank for delivering rotary energy to a desired receptor.

16. A multi-source passive power generation system as defined in claim 15 wherein:
sixteen tubular spokes extend from said hub and are equally spaced about said hub.

17. A multi-source passive power generation system as defined in claim 15 wherein said air chamber means comprises:
a spherical chamber having a plurality of passages through the chamber; and
a bladder positioned within said chamber and operably connected to the distal end of an adjacent tubular spoke.

18. A multi-source passive power generation system as defined in claim 15 wherein said air chamber means comprises:
- a cylindrical section and a spherical chamber; and
- a bladder positioned within said cylindrical section and being operably connected to the distal end of an adjacent tubular spoke and operable to extend into said spherical chamber.

19. A multi-source passive power generation system as defined in claim 15 wherein said air chamber means comprises:
- a pair of opposing and telescoping cylindrical cans.

20. A multi-source passive power generation system as defined in claim 15 and further comprising:
- a weight mounted for translation along each of said tubular spokes; and
- cam means for guiding translation of each of said weights mounted upon said tubular spokes.

* * * * *